United States Patent
Wang et al.

(10) Patent No.: US 11,250,849 B2
(45) Date of Patent: Feb. 15, 2022

(54) VOICE WAKE-UP DETECTION FROM SYLLABLE AND FREQUENCY CHARACTERISTIC

(71) Applicant: Realtek Semiconductor Corporation, Hsinchu (CN)

(72) Inventors: Chi-Te Wang, Hsinchu (TW); Wen-Yu Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 211 days.

(21) Appl. No.: 16/662,157

(22) Filed: Oct. 24, 2019

(65) Prior Publication Data

US 2020/0219502 A1 Jul. 9, 2020

(30) Foreign Application Priority Data

Jan. 8, 2019 (TW) ................................ 108100752

(51) Int. Cl.
*G10L 15/22* (2006.01)
*G10L 25/78* (2013.01)
*G10L 15/02* (2006.01)
*G10L 15/06* (2013.01)

(52) U.S. Cl.
CPC .............. *G10L 15/22* (2013.01); *G10L 15/02* (2013.01); *G10L 15/063* (2013.01); *G10L 2015/027* (2013.01); *G10L 2015/0631* (2013.01); *G10L 2015/223* (2013.01)

(58) Field of Classification Search
CPC ... G10L 15/20; G10L 15/22; G10L 2015/027; G10L 2015/088; G10L 25/06; G10L 25/09; G10L 25/21; G10L 25/78

USPC ....... 704/205, 206, 217, 233, 236, 251, 254, 704/270, 275, 210, 215
See application file for complete search history.

(56) References Cited

U.S. PATENT DOCUMENTS

| | | | | |
|---|---|---|---|---|
| 5,056,150 A | * | 10/1991 | Yu | G10L 25/87 704/248 |
| 5,675,705 A | * | 10/1997 | Singhal | G10L 15/02 704/254 |
| 7,127,392 B1 | * | 10/2006 | Smith | G10L 25/78 704/215 |

(Continued)

FOREIGN PATENT DOCUMENTS

CN 108615535 A 10/2018

*Primary Examiner* — Martin Lerner
(74) *Attorney, Agent, or Firm* — Locke Lord LLP; Tim Tingkang Xia, Esq.

(57) ABSTRACT

A voice wake-up apparatus used in an electronic device that includes a voice activity detection circuit, a storage circuit and a smart detection circuit is provided. The voice activity detection circuit receives an input sound signal and detects a voice activity section of the input sound signal. The storage circuit stores a predetermined voice sample. The smart detection circuit receives the input sound signal to perform a time domain and a frequency domain detection on the voice activity section to generate a syllable and frequency characteristic detection result, compare the syllable and frequency characteristic detection result with the predetermined voice sample and generate a wake-up signal to a processing circuit of the electronic device when the syllable and frequency characteristic detection result matches the predetermined voice sample to wake up the processing circuit.

14 Claims, 6 Drawing Sheets

(56) References Cited

U.S. PATENT DOCUMENTS

| | | | |
|---|---|---|---|
| 10,403,279 B2 * | 9/2019 | Zhao | G10L 25/78 |
| 2002/0103636 A1 * | 8/2002 | Tucker | G10L 25/78 |
| | | | 704/205 |
| 2012/0294459 A1 * | 11/2012 | Chapman | G10H 3/186 |
| | | | 381/98 |
| 2014/0201639 A1 * | 7/2014 | Savolainen | G10L 25/48 |
| | | | 715/727 |
| 2015/0073794 A1 * | 3/2015 | Kalinli-Akbacak | G10L 15/04 |
| | | | 704/243 |
| 2015/0287420 A1 * | 10/2015 | Gao | G10L 25/21 |
| | | | 704/207 |
| 2016/0086603 A1 * | 3/2016 | Rosner | G10L 15/26 |
| | | | 704/275 |
| 2016/0232899 A1 * | 8/2016 | Chen | G10L 15/22 |
| 2016/0260429 A1 * | 9/2016 | Jin | G10L 15/08 |
| 2017/0206895 A1 * | 7/2017 | Tang | G10L 15/083 |
| 2018/0158449 A1 * | 6/2018 | Tang | G10L 13/04 |
| 2019/0005954 A1 * | 1/2019 | Xie | G10L 15/063 |
| 2019/0043481 A1 * | 2/2019 | Georges | G10L 15/063 |
| 2019/0066678 A1 * | 2/2019 | Tsukamoto | G10L 15/01 |
| 2019/0214002 A1 * | 7/2019 | Park | G10L 15/22 |
| 2019/0251955 A1 * | 8/2019 | Degraye | G10L 25/78 |

\* cited by examiner

VOICE WAKE-UP DETECTION FROM SYLLABLE AND FREQUENCY CHARACTERISTIC

RELATED APPLICATIONS

This application claims priority to Taiwan Application Serial Number 108100752, filed Jan. 8, 2019, which is herein incorporated by reference.

BACKGROUND

Field of Invention

The present invention relates to a voice wake-up technology. More particularly, the present invention relates to a voice wake-up apparatus and a voice wake-up method.

Description of Related Art

In recent years, a user can control an electronic apparatus by using voice due to the progress of technologies. For example, the user can wake up an electronic apparatus by using voice. In general, the voice wake-up mechanism is triggered by specific voice commands. In current technology, the voice-receiving module can only determine whether a voice message is received. Whether the voice is a command is determined by a processor of the electronic apparatus. However, under such a condition, the processor needs to perform determination occasionally and is not able to enter the sleep state or the standby state. Such an operation mechanism results a larger total power consumption of the electronic apparatus.

Accordingly, what is needed is a voice wake-up apparatus and a voice wake-up method to address the issues mentioned above. The goal is to reduce the false acceptance rate of the processor, reduce the average power of the overall device, and achieve a true standby state.

SUMMARY

An aspect of the present invention is to provide a voice wake-up apparatus used in an electronic device that includes a voice activity detection circuit, a storage circuit and a smart detection circuit. The voice activity detection circuit is configured to receive a sound input signal and detect a voice activity of the sound input signal. The storage circuit is configured to store a predetermined voice sample. The smart detection circuit is configured to receive the sound input signal to perform a time domain detection and a frequency domain detection on the voice activity to generate a syllables and frequency characteristic detection result, compare the syllables and frequency characteristic detection result with the predetermined voice sample and generate a wake-up signal to a processing circuit of the electronic device when the syllables and frequency characteristic detection result matches the predetermined voice sample to wake up the processing circuit.

Another aspect of the present invention is to provide a voice wake-up method used in a voice wake-up apparatus of an electronic device that includes the steps outlined below. A sound input signal is received and a voice activity of the sound input signal is detected by a voice activity detection circuit. The sound input signal is received by a smart detection circuit to perform a time domain detection and a frequency domain detection on the voice activity to generate a syllables and frequency characteristic detection result. The syllables and frequency characteristic detection result and a predetermined voice sample stored by a storage circuit are compared by the smart detection circuit. A wake-up signal to a processing circuit of the electronic device is generated by the smart detection circuit when the syllables and frequency characteristic detection result matches the predetermined voice sample to wake up the processing circuit.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
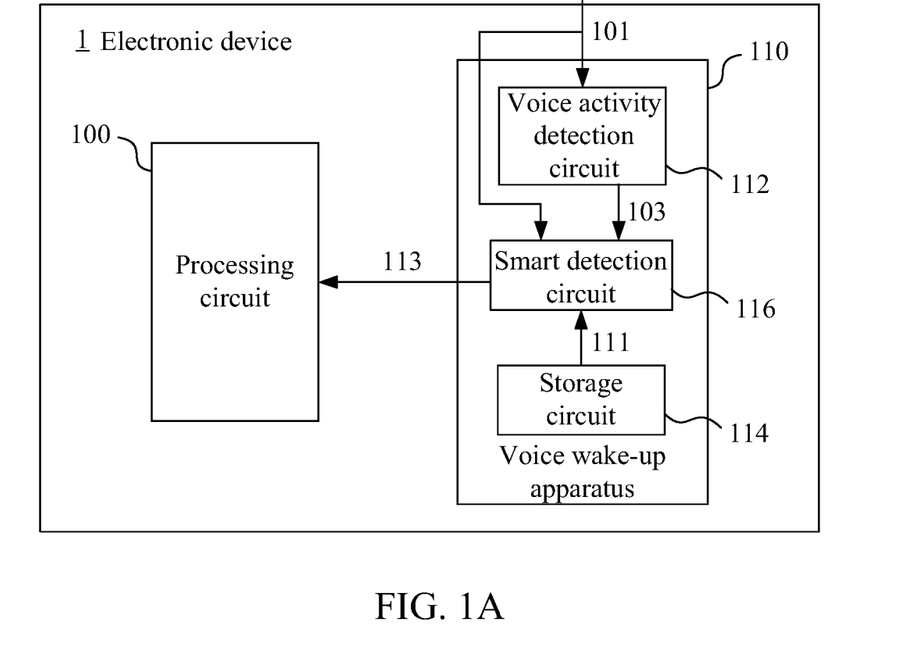
FIG. 1A is a block diagram of an electronic device in an embodiment of the present invention.

Reference is made to FIG. 1A. FIG. 1A is a block diagram of an electronic device 1 in an embodiment of the present invention. The electronic device 1 can be such as, but not limited to a television, a display module, a desktop, a notebook computer or a mobile device such as a smartphone or a tablet personal computer. The electronic device 1 includes a processing circuit 100 and a voice wake-up apparatus 110.

The processing circuit 100 is electrically coupled to the voice wake-up apparatus 110 and other circuit modules that can be disposed in the electronic device 1, such as but not limited to a communication circuit, a display circuit or a power circuit (not illustrated). The processing circuit 100 can process the related information of these circuits and control these circuits under an operation state. In an embodiment, when the processing circuit 100 enters such as a sleep state or a true standby state, the processing circuit 100 almost stops to operate and has a very low power consumption (e.g. smaller than 0.5 watts).

The voice wake-up apparatus 110 is configured to receive a sound input signal 101 to detect whether the sound input signal 101 includes a predetermined wake-up command such that the voice wake-up apparatus 110 wakes up the processing circuit 100 when the sound input signal 101 includes the predetermined wake-up command. The processing circuit 100 can restore the operation state from the sleep state or the true standby state.

The voice wake-up apparatus 110 includes a voice activity detection circuit 112, a storage circuit 114 and a smart detection circuit 116.

The voice activity detection circuit 112 is configured to receive the sound input signal 101 and detect a voice activity of the sound input signal 101.

Figure 1B:
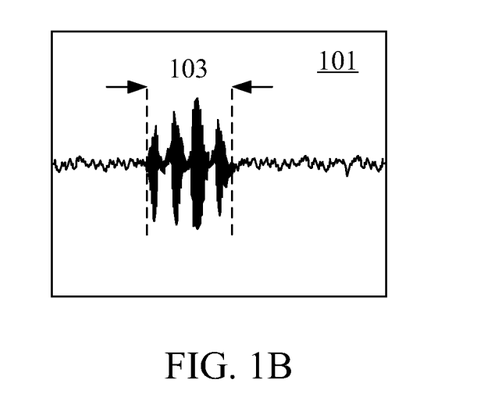
FIG. 1B is a diagram of the sound input signal in an embodiment of the present invention.

Reference is now made to FIG. 1B. FIG. 1B is a diagram of the sound input signal 101 in an embodiment of the present invention. In FIG. 1B, the X axis represents time and the Y axis represents the amplitude of the sound input signal 101.

In an embodiment, the sound input signal 101 may include a sound in the environment and the voice at the same time. The voice activity detection circuit 112 can detect a voice activity 103 in a section of time by using a predetermined algorithm according to the sound input signal 101. For example, the voice activity detection circuit 112 may determine whether a section of voice activity 103 exists by using the steps of performing noise reduction by using spectral subtraction, retrieving characteristic of a section of the sound input signal and performing categorization based on a calculated value of the section and a predetermined threshold value. However, the steps described above are merely an example. The detection method used by the voice activity detection circuit 112 is not limited thereto.

The storage circuit 114 is configured to store a predetermined voice sample 111. The predetermined voice sample 111 can be a user defined sample or an offline training sample. The sample corresponds to the content of the wake-up command. For example, when the wake-up command is "OK Google", such a sample includes the voice content of "OK Google" that includes such as, but not limited to the number of the syllables and the pronunciation of the vowel and consonant.

The smart detection circuit 116 is configured to receive the sound input signal 101 to perform time domain detection and frequency domain detection on the voice activity 103 to generate a syllables and frequency characteristic detection result. In an embodiment, the smart detection circuit 116 is activated to perform detection based on the reception of the voice activity 103 from the voice activity detection circuit 112 after the voice activity detection circuit 112 detects the voice activity 103.

In another embodiment, the smart detection circuit 116 can be activated to perform detection at the same time when the voice activity detection circuit 112 receives the sound input signal 101.

Further, after generating the syllables and frequency characteristic detection result, the smart detection circuit 116 compares the syllables and frequency characteristic detection result with the predetermined voice sample 111 retrieved from the storage circuit 114. When the syllables and frequency characteristic detection result matches the predetermined voice sample 111, the smart detection circuit 116 generates a wake-up signal 113 to the processing circuit 100 to wake up the processing circuit 100.

Figure 2:
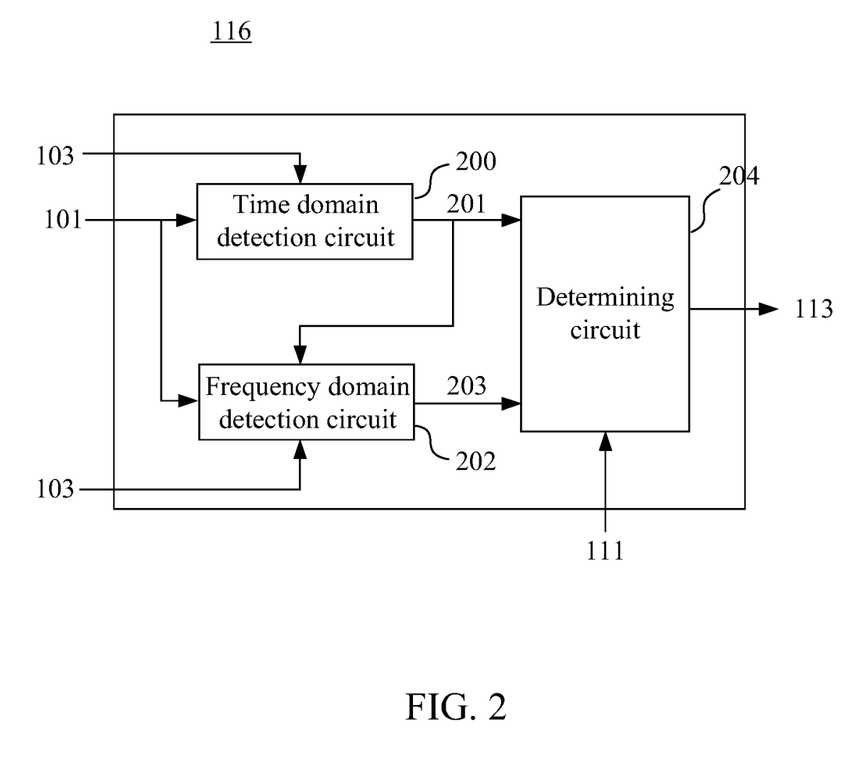
FIG. 2 is a detailed block diagram of the smart detection circuit in an embodiment of the repent invention.

The configuration and the operation of the smart detection circuit 116 is described in further detail in accompany with FIG. 2.

Reference is now made to FIG. 2. FIG. 2 is a detailed block diagram of the smart detection circuit 116 in an embodiment of the present invention. In an embodiment, the smart detection circuit 116 further includes a time domain detection circuit 200, a frequency domain detection circuit 202 and a determining circuit 204.

The time domain detection circuit 200 is configured to receive the sound input signal 101 to detect at least one time domain energy peak on a time domain of the voice activity 103 to generate a time domain syllables detection result 201 according to the at least one time domain energy peak. In different embodiments, the time domain detection performed by the time domain detection circuit 200 is a power calculation detection, a zero-crossing detection, a syllable detection or delay auto-correlation detection.

Figure 3A:
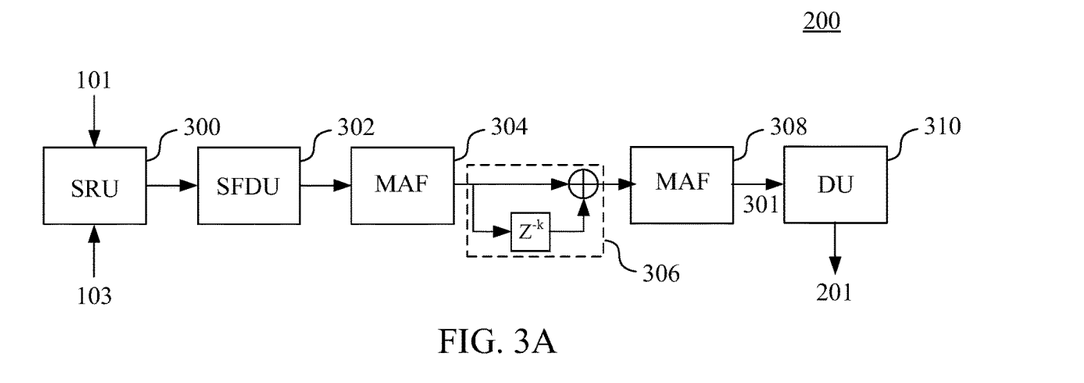
FIG. 3A is a block diagram of the time domain detection circuit in an embodiment of the present invention.
Figure 3B:
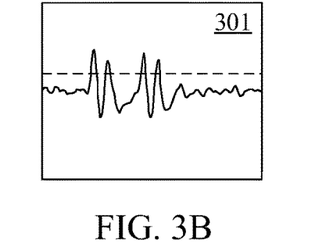
FIG. 3B is a waveform generated after the processing of the time domain detection circuit in an embodiment of the present invention.

Reference is now made to FIG. 3A and FIG. 3B at the same time. FIG. 3A is a block diagram of the time domain detection circuit 200 in an embodiment of the present invention. FIG. 3B is a waveform 301 generated after the processing of the time domain detection circuit 200 in an embodiment of the present invention.

As illustrated in FIG. 3A, in an embodiment, the time domain detection circuit 200 can be implemented by a syllables detection circuit and may include a sampling reduction unit 300, a sub frame division unit 302, a moving average filter 304, a high pass filter 306, a moving average filter 308 and a detection unit 310 to respectively perform the reduction of sampling, the search and division of sub frames, a reformation of the waveform to smooth the waveform, a high pass filtering and another reformation of the waveform to smooth the waveform. The sampling reduction unit 300, the sub frame division unit 302, the moving average filter 304, the moving average filter 308 and the detection unit 310 are abbreviated as SRU, SFDU, MAF, MAF and DU respectively in FIG. 3A. The final waveform 301 is thus generated, as illustrated in FIG. 3B. In FIG. 3B, the X axis represents time and the Y axis represents energy intensity. Further, the detection unit 310 sets a predetermined threshold based on the waveform 301 to search for the energy peaks that exceed the predetermined threshold to determine the number of the syllables to generate the time domain syllables detection result 201. In the present embodiment, since the wake-up command is "OK Google", four syllables can be detected.

Figure 3C:
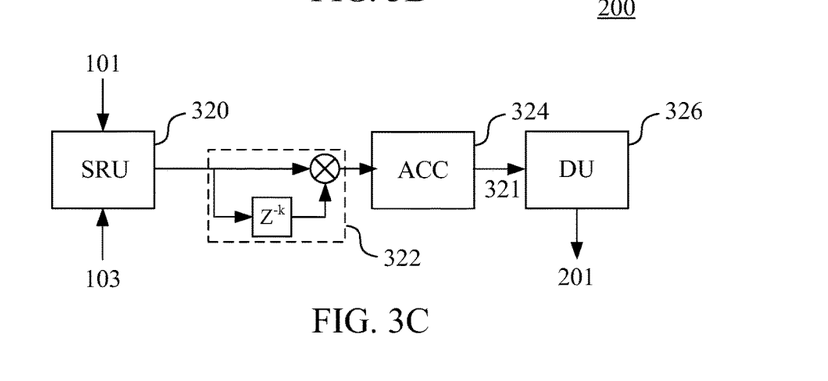
FIG. 3C is a block diagram of the time domain detection circuit in an embodiment of the present invention.
Figure 3D:
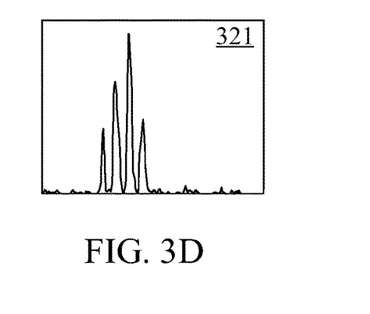
FIG. 3D is a waveform generated after the processing of the time domain detection circuit in an embodiment of the present invention.

Reference is now made to FIG. 3C and FIG. 3D at the same time. FIG. 3C is a block diagram of the time domain detection circuit 200 in an embodiment of the present invention. FIG. 3D is a waveform 321 generated after the processing of the time domain detection circuit 200 in an embodiment of the present invention.

As illustrated in FIG. 3C, in another embodiment, the time domain detection circuit 200 can be implemented by a delay autocorrelation circuit and may include a sampling reduction unit 320, an autocorrelation calculation unit 322, an accumulator 324 and a detection circuit 326 to respectively perform a reduction of sampling, an autocorrelation calculation and an accumulation operation. The sampling reduction unit 320, the accumulator 324 and the detection circuit 326 are abbreviated as SRU, ACC and DU respectively in FIG. 3C. The final waveform 321 is thus generated, as illustrated in FIG. 3D. In FIG. 3D, the X axis represents time and the Y axis represents energy intensity. Further, the detection unit 326 sets a predetermined threshold based on the waveform 321 to search for the energy peaks that exceed the predetermined threshold to determine the number of the syllables to generate the time domain syllables detection result 201. In the present embodiment, since the wake-up command is "OK Google", four syllables can be detected.

The frequency domain detection circuit 202 is configured to receive the sound input signal 101 to detect at least one frequency domain energy peak on a frequency domain of the voice activity 103 to generate a frequency domain syllables and frequency characteristic detection result 203. In different embodiments, the frequency domain detection performed by the frequency domain detection circuit 202 is a filtering detection performed by filter banks or performed according to fast Fourier transform (FFT).

Figure 4A:
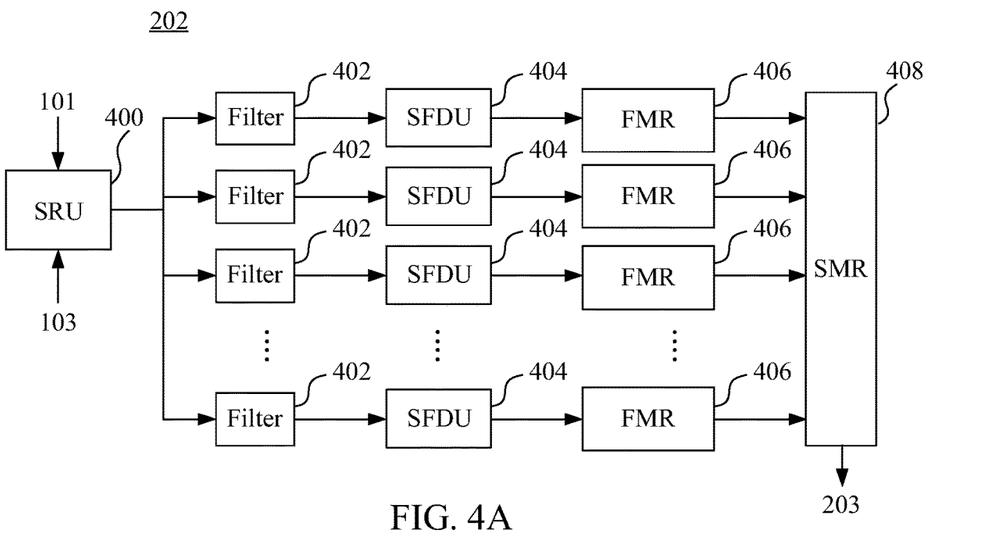
FIG. 4A is a block diagram of the frequency domain detection circuit in an embodiment of the present invention.
Figure 4B:
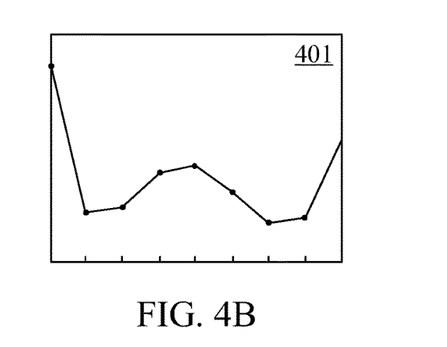
FIG. 4B is a frequency band energy distribution generated after the processing of the frequency domain detection circuit in an embodiment of the present invention.

Reference is now made to FIG. 4A and FIG. 4B at the same time. FIG. 4A is a block diagram of the frequency domain detection circuit 202 in an embodiment of the present invention. FIG. 4B is a frequency band energy distribution 401 generated after the processing of the frequency domain detection circuit 202 in an embodiment of the present invention.

As illustrated in FIG. 4A, in an embodiment, the frequency domain detection circuit 202 is implemented by filtering bank circuit and may include sampling reduction unit 400, a plurality groups of filters 402 corresponding to different frequency bands and covering the range from 50 Hz to 1000 Hz, sub frame division units 404 each corresponding to a filter 402, first maximum retrieving units 406 each corresponding to a sub frame division unit 404 and a second maximum retrieving unit 408 to respectively perform the reduction of the sampling, the band pass filtering, the search and division of sub frames and the retrieving of the maximum energy value of each frequency band. The sampling reduction unit 400, the sub frame division units 404, the first maximum retrieving units 406 and the second maximum retrieving unit 408 are abbreviated as SRU, SFDU, FMR and SMR respectively in FIG. 4A. The final frequency band energy distribution 401 is thus generated, as illustrated in FIG. 4B. In FIG. 4B, the X axis represents the numbers of the different filters 402 and the Y axis represents the corresponding energy intensity maximum.

Further, the second maximum retrieving unit 408 retrieves a maximum from the maximum values retrieved by the first maximum retrieving units 406 to determine the energy peaks on the frequency domain to further determine the number of the syllables accordingly.

In an embodiment, the vowel of the voice has a certain harmonics and the consonant does not have the harmonics. As a result, based on the harmonic characteristics of part of the frequency bands, the second maximum retrieving unit 408 can also detect the existence of the vowel and consonant to further generate the frequency domain syllables and frequency characteristic detection result 203.

Figure 4C:
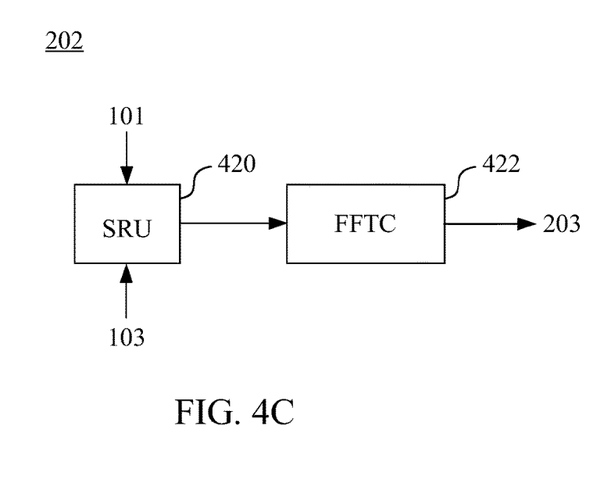
FIG. 4C is a block diagram of the frequency domain detection circuit in an embodiment of the present invention.

Reference is now made to FIG. 4C. FIG. 4C is a block diagram of the frequency domain detection circuit 202 in an embodiment of the present invention.

As illustrated in FIG. 4C, in an embodiment, the frequency domain detection circuit 202 can be implemented by the fast Fourier transform filtering circuit and may include a sampling reduction unit 420 and a fast Fourier transform calculation unit 422 to respectively perform the reduction of sampling and the fast Fourier transform to generate a frequency spectrum analysis diagram to further search the energy peaks in different frequency bands to determine the number of syllables. The sampling reduction unit 420 and the fast Fourier transform calculation unit 422 are abbreviated as SRU and FFTC respectively in FIG. 4C.

Further, the vowel of the voice has certain harmonics and the consonant does not have the harmonics. As a result, based on the harmonic characteristics of part of the frequency bands, the fast Fourier transform calculation unit 422 can also detect the existence of the vowel and consonant to further generate the frequency domain syllables and frequency characteristic detection result 203.

The determining circuit 204 is configured to compare the time domain syllables detection result 201 and the frequency domain syllables and frequency characteristic detection result 203 respectively with the predetermined voice sample 111.

Figure 5:
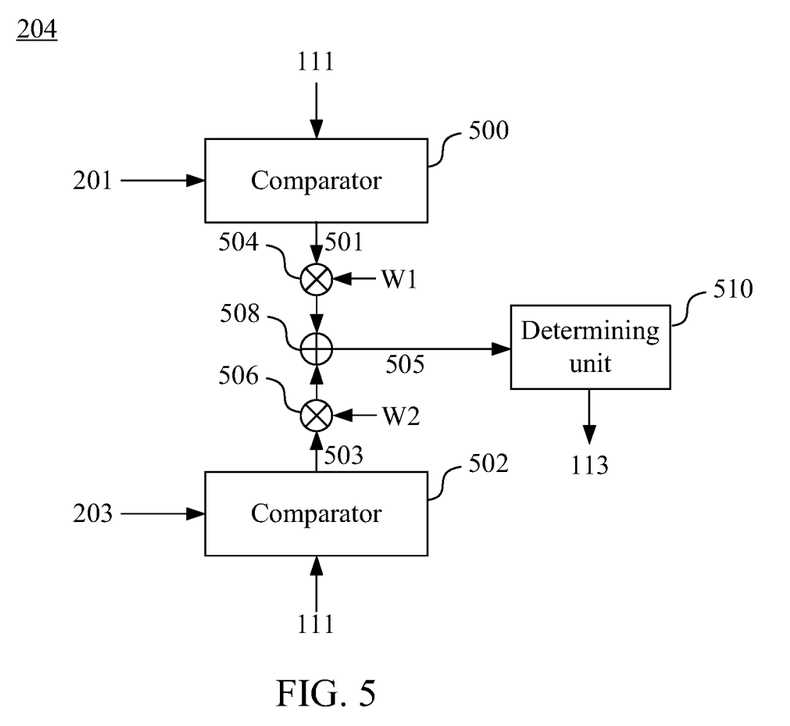
FIG. 5 is a detailed block diagram of the determining circuit in an embodiment of the present invention.

Reference is now made to FIG. 5. FIG. 5 is a detailed block diagram of the determining circuit 204 in an embodiment of the present invention.

In the present embodiment, the determining circuit 204 includes a comparator 500, a comparator 502, a weighting unit 504, a weighting unit 506 a sum calculation unit 508 and a determining unit 510.

The comparator 500 is configured to compare the time domain syllables detection result 201 with the predetermined voice sample 111 to generate a time domain comparison result 501. In an embodiment, the time domain comparison result 501 is generated by such as, but not limited to scoring and the score can be weighted by the weighting unit 504 according to a weighting number W1.

The comparator 502 is configured to compare the frequency domain syllables and frequency characteristic detection result 203 with the predetermined voice sample 111 to generate a frequency domain comparison result 503. In an embodiment, the frequency domain comparison result 503 is generated by such as, but not limited to scoring and the score can be weighted by the weighting unit 506 according to a weighting number W2.

The sum calculation unit 508 further sums the weighted results from the weighting unit 504 and the weighting unit 506 to generate a weighted sum 505. The determining circuit 510 determines that whether the weighted sum matches a predetermined range corresponding to the predetermined voice sample 111. The determining circuit 510 determines that the syllables and the frequency characteristic detection result of the time domain and the frequency domain matches the predetermined voice sample 111 when the weighted sum 505 matches the predetermined range corresponding to the predetermined voice sample (e.g. the difference is within ±20% of the predetermined voice sample) to generate the wake-up signal 113 accordingly.

Consequently, the voice wake-up apparatus 110 of the present invention can quickly identify the syllables number and the vowel and consonant of the voice activity by using the detection on time domain and the frequency domain such that the detection result is compared with the predetermined voice sample 111 to determine whether the detection result matches the wake-up command. When the detection result matches the wake-up command, the voice wake-up apparatus 110 wakes up the processing circuit 100 of the electronic device 1. The processing circuit 100 is not required to be woke up every time a voice activity occurs to perform identification. The power consumption of the electronic device 1 can be greatly reduced.

Figure 6:
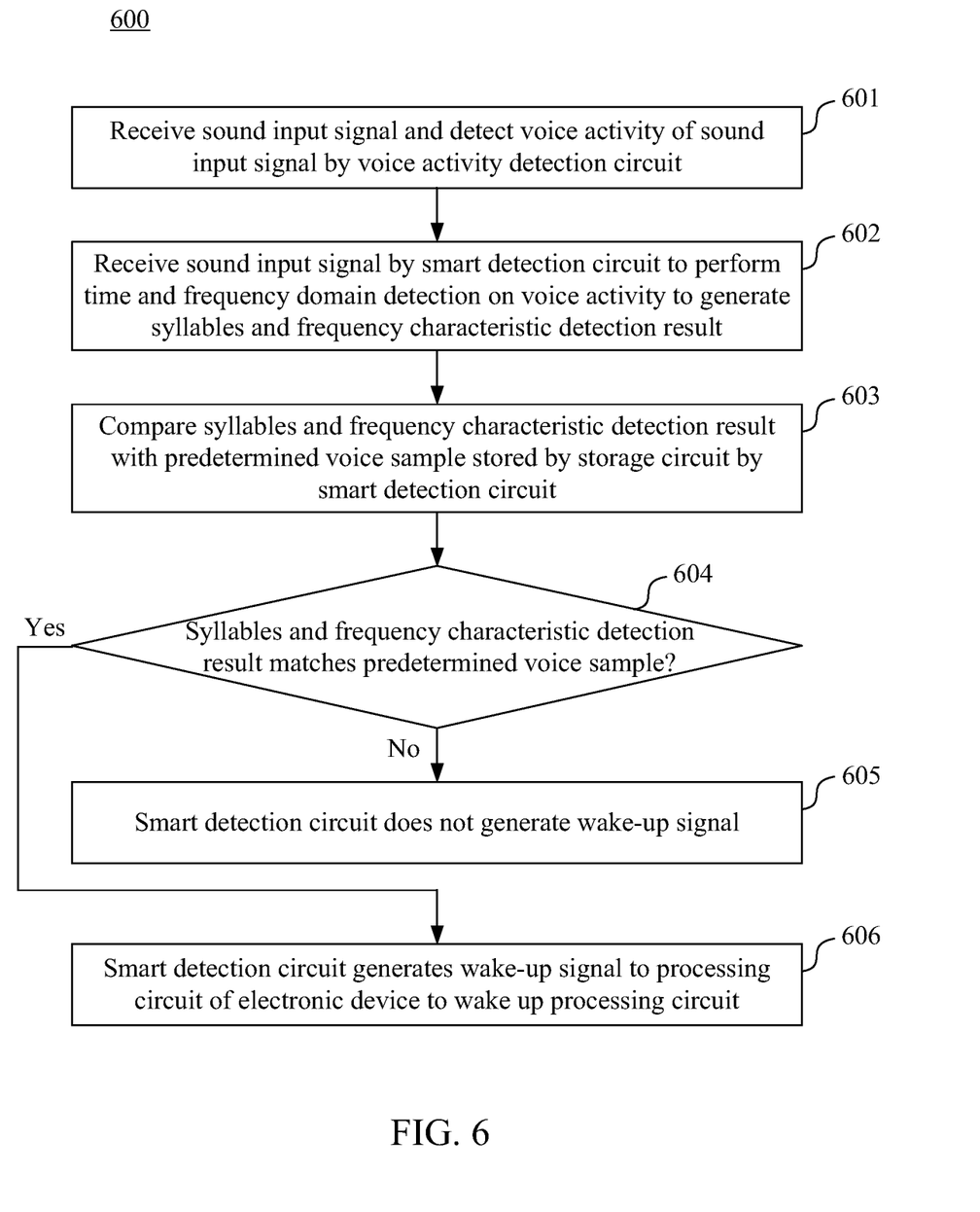
FIG. 6 is a flow chart of a voice wake-up method in an embodiment of the present invention.

FIG. 6 is a flow chart of a voice wake-up method 600 in an embodiment of the present invention. The voice wake-up method 600 can be used in the voice wake-up apparatus 110 in FIG. 1A.

The voice wake-up method 600 includes the steps outlined below (The steps are not recited in the sequence in which the operations are performed. That is, unless the sequence of the operations is expressly indicated, the sequence of the steps is interchangeable, and all or part of the steps may be simultaneously, partially simultaneously, or sequentially performed).

In step 601, the sound input signal 101 is received and the voice activity 103 of the sound input signal 101 is detected by the voice activity detection circuit 112.

In step 602, the sound input signal 101 is received by the smart detection circuit 116 to perform the time domain detection and the frequency domain detection on the voice activity 103 to generate the syllables and frequency characteristic detection result.

In step 603, the syllables and frequency characteristic detection result and the predetermined voice sample 111 stored by the storage circuit 114 are compared by the smart detection circuit 116.

In step 604, whether the syllables and frequency characteristic detection result matches the predetermined voice sample 111 is determined by the smart detection circuit 116.

When the syllables and frequency characteristic detection result does not match the predetermined voice sample 111, in step 605, the smart detection circuit 116 does not generate the wake-up signal 113.

When the syllables and frequency characteristic detection result matches the predetermined voice sample 111, in step 606, the smart detection circuit 116 generates the wake-up signal 113 to the processing circuit 100 of the electronic device 1 to wake up the processing circuit 100.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A voice wake-up apparatus used in an electronic device, comprising:
a voice activity detection circuit configured to receive a sound input signal and detect a voice activity of the sound input signal;
a storage circuit configured to store a predetermined voice sample; and
a smart detection circuit comprising:
a time domain detection circuit configured to receive the sound input signal to detect at least one time domain energy peak on a time domain of the voice activity to generate a time domain syllables detection result according to the at least one time domain energy peak;
a frequency domain detection circuit configured to receive the sound input signal to detect at least one frequency domain energy peak and a harmonic characteristic on a frequency domain of the voice activity to generate a frequency domain syllables and frequency characteristic detection result according to the at least one frequency domain energy peak and the harmonic characteristic; and
a determining circuit configured to compare the time domain syllables detection result and the frequency domain syllables and frequency characteristic detection result with the predetermined voice sample respectively to generate a wake-up signal when the time domain syllables detection result and the frequency domain syllables and frequency characteristic detection result match the predetermined voice sample.

2. The voice wake-up apparatus of claim 1, wherein the determining circuit weights a time domain comparison result generated by comparing the time domain syllables detection result with the predetermined voice sample and weights a frequency domain comparison result generated by comparing the frequency domain syllables and frequency characteristic detection result with the predetermined voice sample to generate a weighted sum such that the determining circuit generates the wake-up signal when the weighted sum matches a predetermined range corresponding to the predetermined voice sample.

3. The voice wake-up apparatus of claim 1, wherein the time domain detection circuit is configured to perform a power calculation detection, a zero-crossing detection, a syllable detection or delay auto-correlation detection.

4. The voice wake-up apparatus of claim 1, wherein the frequency domain detection circuit is configured to perform a filtering detection performed by filter banks or performed according to fast Fourier transform (FFT).

5. The voice wake-up apparatus of claim 1, wherein the predetermined voice sample is a user defined sample or an offline training sample.

6. The voice wake-up apparatus of claim 1, wherein the smart detection circuit is activated based on a reception of the voice activity from the voice activity detection circuit.

7. The voice wake-up apparatus of claim 1, wherein the smart detection circuit is activated at the same time when the voice activity detection circuit receives the sound input signal.

8. A voice wake-up method used in a voice wake-up apparatus of an electronic device, comprising:
receiving a sound input signal and detecting a voice activity of the sound input signal by a voice activity detection circuit;
receiving the sound input signal by a smart detection circuit to perform a time domain detection and a frequency domain detection on the voice activity to generate a syllables and frequency characteristic detection result;
receiving the sound input signal by a time domain detection circuit to detect at least one time domain energy peak on a time domain of the voice activity to generate a time domain syllables detection result according to the at least one time domain energy peak;
receiving the sound input signal by a frequency domain detection circuit to detect at least one frequency domain energy peak and a harmonic characteristic on a frequency domain of the voice activity to generate a frequency domain syllables and frequency characteristic detection result according to the at least one frequency domain energy peak and the harmonic characteristic; and
comparing the time domain syllables detection result and the frequency domain syllables and frequency characteristic detection result with a predetermined voice sample respectively by a determining circuit to generate a wake-up signal when the time domain syllables detection result and the frequency domain syllables and frequency characteristic detection result match the predetermined voice sample.

9. The voice wake-up method of claim 8, further comprising:
weighting a time domain comparison result generated by comparing the time domain syllables detection result with the predetermined voice sample and weighting a frequency domain comparison result generated by comparing the frequency domain syllables and frequency characteristic detection result with the predetermined voice sample by the determining circuit to generate a weighted sum such that the determining circuit generates the wake-up signal when the weighted sum matches a predetermined range corresponding to the predetermined voice sample.

10. The voice wake-up method of claim 8, wherein the time domain detection is a power calculation detection, a zero-crossing detection, a syllable detection or delay autocorrelation detection.

11. The voice wake-up method of claim 8, wherein the frequency domain detection is a filtering detection performed by filter banks or performed according to fast Fourier transform (FFT).

12. The voice wake-up method of claim 8, wherein the predetermined voice sample is a user defined sample or an offline training sample.

13. The voice wake-up method of claim 8, wherein the smart detection circuit is activated based on a reception of the voice activity from the voice activity detection circuit.

14. The voice wake-up method of claim 8, wherein the smart detection circuit is activated at the same time when the voice activity detection circuit receives the sound input signal.

* * * * *

UNITED STATES PATENT AND TRADEMARK OFFICE
CERTIFICATE OF CORRECTION

PATENT NO. : 11,250,849 B2  
APPLICATION NO. : 16/662157  
DATED : February 15, 2022  
INVENTOR(S) : Chi-Te Wang et al.

Page 1 of 1

It is certified that error appears in the above-identified patent and that said Letters Patent is hereby corrected as shown below:

On the Title Page

Item (71): reading "Realtek Semiconductor Corporation, Hsinchu (CN)" should read as follows:
-- Realtek Semiconductor Corporation, Hsinchu (TW) --

Signed and Sealed this  
Fifth Day of July, 2022

Katherine Kelly Vidal  
*Director of the United States Patent and Trademark Office*